(12) United States Patent
Yamasaki et al.

(10) Patent No.: US 10,994,359 B2
(45) Date of Patent: May 4, 2021

(54) SETTING ASSISTANCE DEVICE, SETTING ASSISTANCE METHOD, AND PROGRAM (71) Applicant: KOBE STEEL, LTD., Hyogo (JP)

(72) Inventors: Takemasa Yamasaki, Hyogo (JP); Masatoshi Hida, Hyogo (JP); Toshihiko Nishimura, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 727 days.

(21) Appl. No.: 15/553,918

(22) PCT Filed: Feb. 24, 2016

(86) PCT No.: PCT/JP2016/055503
§ 371 (c)(1),
(2) Date: Aug. 25, 2017

(87) PCT Pub. No.: WO2016/136831
PCT Pub. Date: Sep. 1, 2016

(65) Prior Publication Data
US 2018/0043453 A1  Feb. 15, 2018

(30) Foreign Application Priority Data

Feb. 27, 2015  (JP) .............................. JP2015-039147

(51) Int. Cl.
*B23K 9/095* (2006.01)
*B23K 9/10* (2006.01)
(Continued)

(52) U.S. Cl.
CPC .......... *B23K 9/0953* (2013.01); *B23K 9/1062* (2013.01); *B23K 9/1081* (2013.01);
(Continued)

(58) Field of Classification Search
CPC .. B23K 9/0953; B23K 9/1087; B23K 9/1081; B23K 9/1062; B23K 11/257; B23K 11/258
(Continued)

(56) References Cited

U.S. PATENT DOCUMENTS 6,096,994 A    8/2000  Handa et al.
2002/0023721 A1  2/2002  Kawamoto et al.
(Continued)

FOREIGN PATENT DOCUMENTS

EP   2 418 038 A1    2/2012
JP   H09-103876 A    4/1997
(Continued)

OTHER PUBLICATIONS

English translation to JPH09103876 (Year: 1995).*
(Continued)

*Primary Examiner* — Phuong T Nguyen
*Assistant Examiner* — Bonita Khlok
(74) *Attorney, Agent, or Firm* — Studebaker & Brackett PC (57) ABSTRACT

Provided is a setting assistance device capable of informing that which welding condition should be corrected with a value as the limit in order to achieve the target quality. In a setting assistance device (40) of a welding condition which is a condition in welding, an input receiving unit (42) accepts designation of the target quality in welding, and a welding condition information output unit (44) outputs an item of a welding condition to be corrected to achieve the target quality, and limit information indicating a limit of a value which can be taken by the item of the welding condition to achieve the target quality, in accordance with the acceptance of the designation of the target quality by the input receiving unit (42).

6 Claims, 9 Drawing Sheets

(51) Int. Cl.
    *B23K 31/02*     (2006.01)
    *B23K 11/25*     (2006.01)

(52) U.S. Cl.
    CPC ............ *B23K 31/02* (2013.01); *B23K 11/257* (2013.01); *B23K 11/258* (2013.01)

(58) Field of Classification Search
    USPC ........................................................ 219/214
    See application file for complete search history.

(56) References Cited

U.S. PATENT DOCUMENTS

| | | |
|---|---|---|
| 2004/0232128 A1 | 11/2004 | Niedereder et al. |
| 2005/0173390 A1 | 8/2005 | Lanouette et al. |
| 2013/0001209 A1 | 1/2013 | Hirota et al. |
| 2015/0209888 A1 | 7/2015 | Hirota et al. |

FOREIGN PATENT DOCUMENTS

| | | | |
|---|---|---|---|
| JP | h09103876 | * | 4/1997 |
| JP | 2001-347374 A | | 12/2001 |
| JP | 2001347374 | * | 12/2001 |
| WO | 97/10919 A1 | | 3/1997 |
| WO | 2012/032702 A1 | | 3/2012 |
| WO | 2012/035718 A1 | | 3/2012 |

OTHER PUBLICATIONS

English translation to jp2001347374 (Year: 2001).*
English translation to jph09103876 (Year: 1997).*
International Search Report issued in PCT/JP2016/055503; dated May 24, 2016.
Written Opinion issued in PCT/JP2016/055503; dated May 24, 2016.

* cited by examiner

| TARGET QUALITY | WELDING CONDITION ITEM | LIMIT INFORMATION |
|---|---|---|
| CONSTANT DEPOSITION QUANTITY | WELDING CURRENT | CONSTANT DEPOSITION QUANTITY CURVE |
| | WELDING SPEED | |
| NORMAL BEAD FORMATION | WELDING CURRENT | NORMAL BEAD FORMATION RANGE |
| | WELDING SPEED | |
| REQUIRED PENETRATION DEPTH | WELDING CURRENT | ... |
| | WELDING VOLTAGE | VOLTAGE PENETRATION STRAIGHT LINE |
| | WELDING SPEED | ... |
| REQUIRED BEAD IRREGULARITY | WELDING CURRENT | ... |
| | WELDING VOLTAGE | VOLTAGE BEAD STRAIGHT LINE |
| | WELDING SPEED | ... |
| ⋮ | ⋮ | ⋮ |

UNDER-SETTING WELDING CONDITION
(270A, 18cpm)

UNDER-SETTING WELDING CONDITION
(300A, 27cpm)

SETTING ASSISTANCE DEVICE, SETTING ASSISTANCE METHOD, AND PROGRAM

TECHNICAL FIELD

The present invention relates to a setting assistance device, a setting assistance method and a program of welding conditions which are conditions in welding.

BACKGROUND ART

When carrying out welding, in accordance with a joint shape or a material of an object to be welded (work piece), a work for setting conditions (hereinafter referred to as "welding conditions") related to welding such as a welding method, current or voltage of welding device, a welding speed, and a torch angle is performed. Specifically, the welding conditions for obtaining a desired result are set by repeating the welding of the actual work piece and the work of correcting the welding condition.

As techniques for improving the work of correcting the welding conditions as described above, various techniques have heretofore been known (see, for example, Patent References 1 to 4).

Patent Reference 1 discloses an automatic welding condition setting device which sets welding construction information, sets welding object information, searches welding information matching search information from a welding information recording unit, using the welding construction information and the welding object information as a series of search information, calculates the welding information from the welding information derivation processing unit if there is no corresponding information as a result of the search, and performs the welding by the welding conditions set up by the welding information search or the welding information calculation.

Patent Reference 2 discloses a welding condition determining method which determines and displays the recommended values of the welding condition such as the welding current, the welding voltage, the wire feeding speed, the welding speed and the leg length suitable for the work, when an operator sets information on the welding object and information on the welding method, and determines and displays the new recommended values of the welding condition suitable for the value after the change even if the operator changes the value from the recommended value of the welding conditions.

Patent Reference 3 discloses an arc welding condition setting method of selecting welding equipment, inputting preconditions for welding, inputting the product required quality, inputting an allowable range of welding variation factors, and calculating an appropriate welding condition that satisfies the product required quality even if the variation factor fluctuates within an allowable range in accordance with the correlation analysis result and the boundary conditions based on the past welding results.

Patent Reference 4 discloses a welding machine which stores a plurality of associated sets of information on welding objects, values of first welding condition items as welding condition items capable of being set for the welding machine, and values of second welding condition items as welding condition items incapable of being set for the welding machine, selects the values of the first welding condition items and the values of the second welding condition items on the basis of the set information concerning the welding object, displays the values of the first welding condition items on the first display unit and displays the values of the second welding condition items on the second display unit.

CITATION LIST

Patent Reference

Patent Reference 1: WO 97/10919
Patent Reference 2: WO 2012/035718
Patent Reference 3: JP-A-2001-347374

Patent Reference 4: WO 2012/032702

SUMMARY OF THE INVENTION

Problems that the Invention is to Solve

However, although the welding conditions searched or calculated by the techniques of Patent References 1 to 4 are capable of achieving quality close to the target quality, it is not possible to achieve the same quality as the target quality. Therefore, after that, trial and error of welding the actual work piece and correcting work of the welding condition may occur.

Here, factors causing trial and error are as follows. That is, first, it is not known that which welding condition should be corrected to achieve the target quality. Second, even if the welding condition to be corrected in order to achieve the target quality is known, it is not known that what value of the welding condition should be limited to correct the welding condition.

An object of the present invention is to inform which welding condition should be corrected with a value as a limit in order to achieve the target quality.

Means for Solving the Problems

Under such a purpose, the present invention provides a setting assistance device of a welding condition which is a condition in welding, the device including: a receiving unit which receives designation of a target quality in the welding; a display unit which displays an item of a welding condition to be corrected to achieve the target quality, and limit information indicating a limit of an allowable item value to achieve the target quality, depending on acceptance of designation of the target quality by the receiving unit.

Here, the display unit may further display a value which is currently set in the item in accordance with acceptance of designation of the target quality using the receiving unit.

Further, the display unit may further display another target quality that is affected by correcting the value of the item, and another limit information indicating a limit of an allowable item value to achieve another target quality, in accordance with acceptance of designation of the target quality using the receiving unit.

Also, the display unit may further display a margin degree of the value currently set in the item for a range of the allowable item values in accordance with the acceptance of designation of the target quality using the receiving unit.

Furthermore, the device may further include a setting unit which sets the welding condition, wherein the display unit displays a graph or a range including a plurality of points respectively corresponding to the plurality of values of the item as the limit information, and the setting unit sets a value corresponding to the specific point in the item, in accordance with a manipulation of instructing a specific point included in the graph or the range displayed by the display unit.

Also, the present invention provides a setting assistance method of a welding condition which is a condition in welding, the method including: accepting designation of a target quality in the welding; and displaying an item of a welding condition to be corrected to achieve the target quality, and limit information indicating a limit of an allowable item value to achieve the target quality, depending on the acceptance of designation of the target quality.

Further, the present invention also provides a program which causes a computer to function as a setting assistance device of a welding condition that is a condition in welding, the program causes the computer to function as a receiving unit which receives designation of a target quality in the welding, and as a display unit which displays an item of a welding condition to be corrected to achieve the target quality, and limit information indicating a limit of an allowable item value to achieve the target quality, depending on acceptance of the designation of the target quality using the receiving unit.

Advantages of the Invention

According to the present invention, it is known which welding condition should be corrected with a value as the limit in order to achieve the target quality.

MODES FOR CARRYING OUT THE INVENTION

Hereinafter, embodiments of the present invention will be described in detail with reference to the accompanying drawings.

Configuration of Welding Robot System

Figure 1:
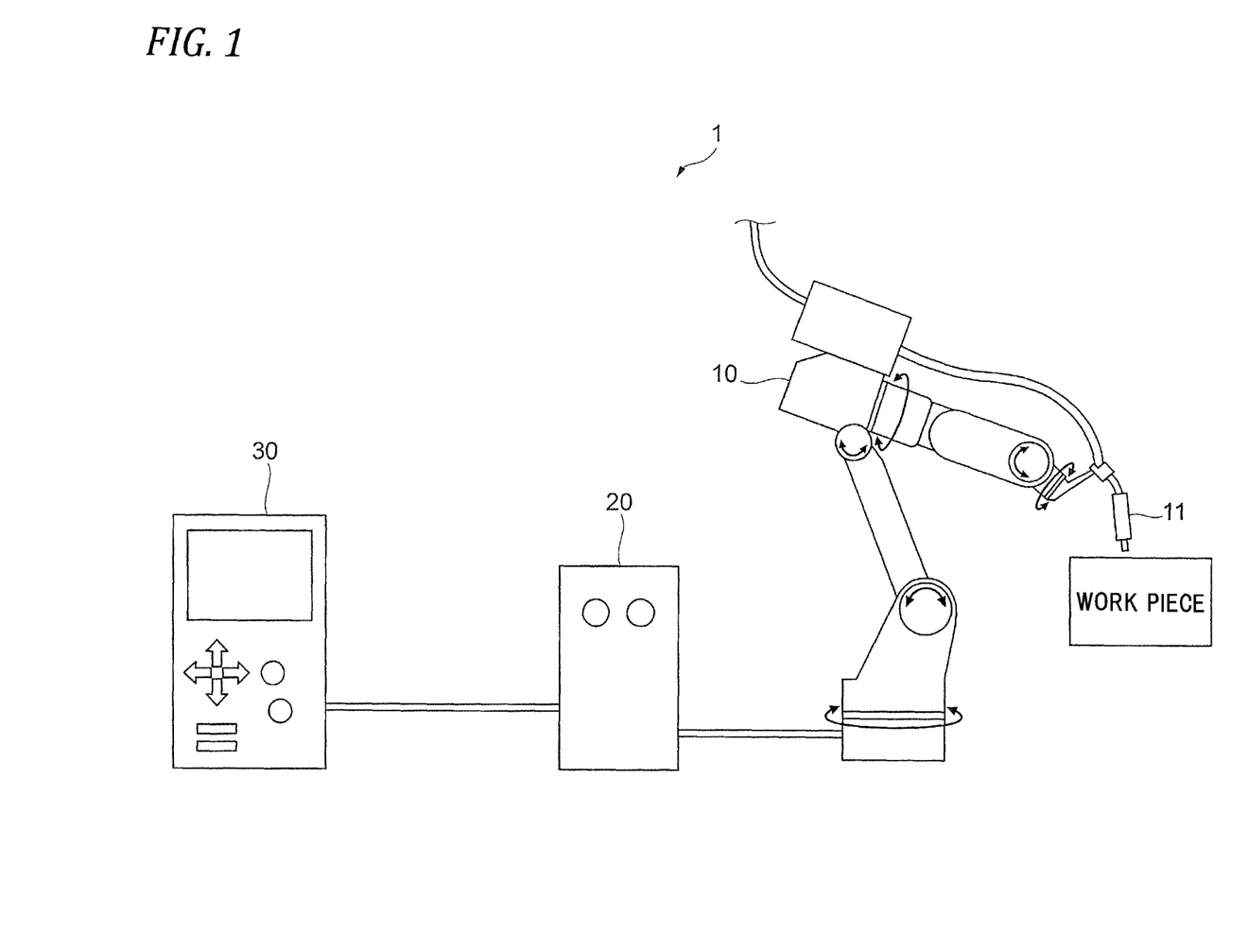
FIG. 1 is a diagram illustrating a schematic configuration example of a welding robot system according to an embodiment of the present invention.

FIG. 1 is a diagram illustrating a schematic configuration example of a welding robot system 1 according to the present embodiment.

As illustrated, the welding robot system 1 includes a welding robot (manipulator) 10 which performs welding on a welding target (work piece) by electrodes, a robot control panel 20 which controls the welding robot system 1, and a teaching pendant 30 which inputs and outputs teaching data for controlling the welding robot system 1 using various keys or a liquid crystal screen.

The welding robot 10 includes an arm having a plurality of joints and performs various work based on the teaching data. In the case of the welding robot system 1, a welding torch 11 for welding the work piece is provided at the tip of the arm. The welding torch 11 is intended to supply a welding wire to a groove (a groove provided between base materials of the work piece).

The robot control panel 20 is provided apart from the welding robot 10 and controls the operation of each welding machine constituting the welding robot system 1. For example, the robot control panel 20 controls a welding operation of the welding robot 10, a feeding operation of a welding wire provided by a feeding device (not illustrated), an operation of supplying the electric power to electrodes and work pieces provided by a welding power supply (not illustrated), and the like. At that time, the robot control panel 20 controls each operation based on welding conditions and the like transmitted from the teaching pendant 30. Further, the robot control panel 20 transmits various kinds of information outputted by the welding robot 10 to the teaching pendant 30.

When the operator inputs the welding conditions and the like as teaching data in order to perform welding work by the welding robot 10, the teaching pendant 30 transmits the welding condition and the like to the robot control panel 20. Further, the teaching pendant 30 displays various kinds of information transmitted from the robot control panel 20 on the liquid crystal screen. In the present embodiment, a teaching pendant 30 is provided as an example of a display unit.

Outline of Present Embodiment

In the present embodiment, the welding conditions to be corrected for achieving the target quality, the range of the welding condition, the welding condition currently being set, the margin degree of the welding condition currently being set for the range of the welding condition, and the like are displayed, thereby assisting setting of welding conditions. Hereinafter, the functional configuration and the operation thereof will be described assuming that assistance for such setting is performed by the setting assistance device. The setting assistance device may be achieved by any of the inside of the welding robot 10, the robot control panel 20, the teaching pendant 30, and another device, but the setting assistance device may be achieved by the inside of the welding robot 10 here.

Functional Configuration of Setting Assistance Device

Figure 2:
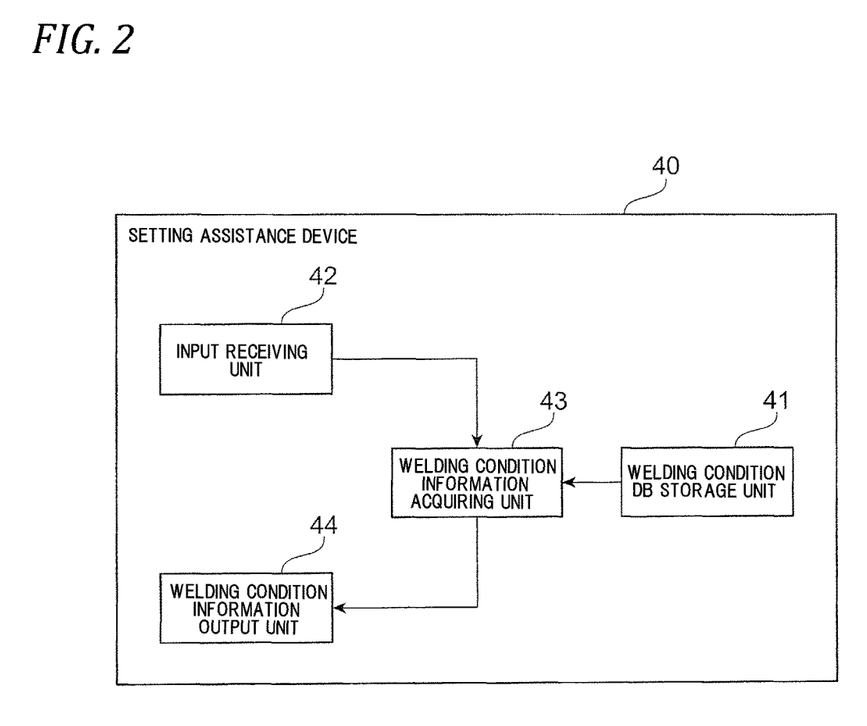
FIG. 2 is a diagram illustrating a functional configuration example of a setting assistance device according to the embodiment of the present invention.

FIG. 2 is a diagram illustrating a functional configuration example of the setting assistance device 40 according to the present embodiment. As illustrated in the drawing, the setting assistance device 40 includes a welding condition database (welding condition DB) storage unit 41, an input receiving unit 42, a welding condition information acquiring unit 43, and a welding condition information output unit 44.

The welding condition DB storage unit 41 stores the welding condition DB which manages the target quality, the items (welding condition items) of welding conditions to be corrected in order to achieve the target quality, and the limit information indicating limit of possible values of welding condition items to achieve the target quality in association with each other. Details of the welding condition DB will be described later.

When the operator confirms the input by pressing the setting key after inputting information using the teaching pendant 30, the input receiving unit 42 receives the information from the teaching pendant 30. In particular, as such information, the input receiving unit 42 first receives the target quality selected first, then accepts the welding condition item to be corrected, and then accepts the target quality to be considered at the same time. In the present embodiment, the input receiving unit 42 is provided as an example of a receiving unit that accepts designation of a target quality.

When the input receiving unit 42 receives information from the teaching pendant 30, the welding condition information acquiring unit 43 acquires information on the welding condition (welding condition information) from the welding condition DB stored in the welding condition DB storage unit 41 or a storage region (not illustrated). In particular, when the input receiving unit 42 receives the first selected target quality, the welding condition information acquiring unit 43 first obtains the welding condition items to be corrected in order to satisfy the target quality from the welding condition DB, as welding condition information. Next, upon accepting the welding condition item to be corrected by the input receiving unit 42, the target quality that is affected by correcting this welding condition item is obtained as welding condition information from the welding condition DB. Thereafter, when the input receiving unit 42 accepts the target quality to be considered at the same time, the limit information indicating the limit according to the target quality of the welding condition item to be corrected is acquired as the welding condition information from the welding condition DB. In addition, limit information based on the mechanical restriction of the welding robot 10 of the welding condition item to be corrected is acquired from the storage region (not illustrated). Further, a under-setting welding condition which is the welding condition currently being set and a margin degree illustrating the margin of the under-setting welding condition are acquired.

The welding condition information output unit 44 outputs the welding condition information acquired by the welding condition information acquiring unit 43 to the teaching pendant 30, thereby presenting the welding condition information to the operator. In particular, the welding condition information output unit 44 first outputs the welding condition item as welding condition information when the input receiving unit 42 receives the initially selected target quality. Next, when the input receiving unit 42 receives the welding condition item to be corrected, it outputs the target quality as welding condition information. Thereafter, when the input receiving unit 42 accepts the target quality to be considered at the same time, the limit information, the under-setting welding condition, and the margin degree are output as the welding condition information.

Contents of Welding Condition DB

Figure 3:
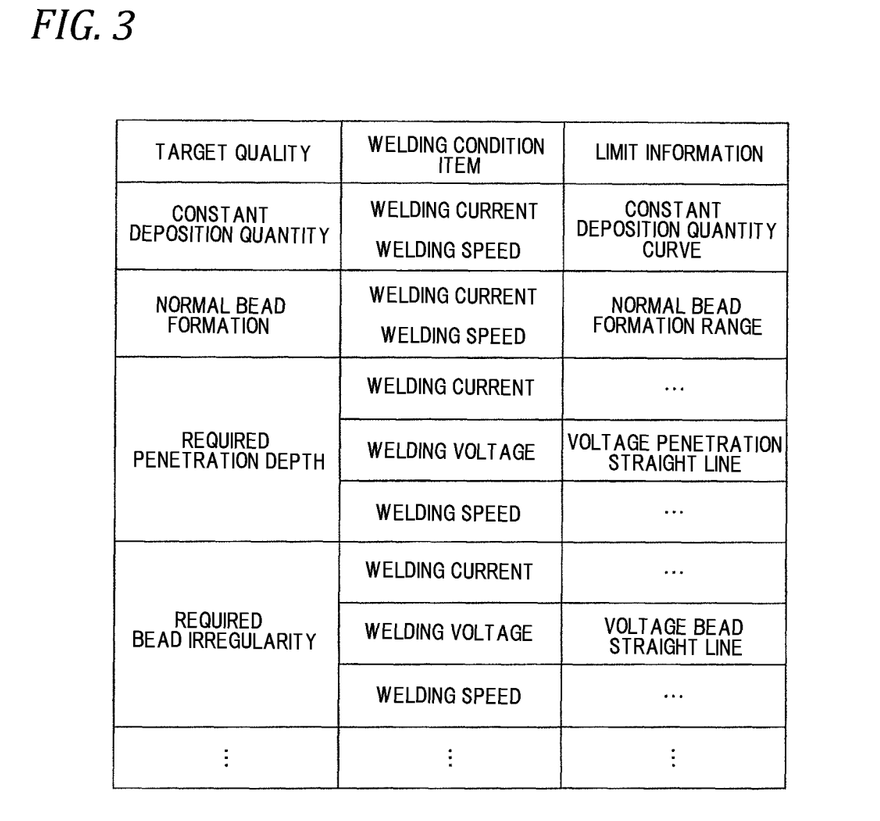
FIG. 3 is a diagram illustrating an example of the contents of a welding condition DB stored in a welding condition DB storage unit.

FIG. 3 is a diagram illustrating an example of the contents of the welding condition DB stored in the welding condition DB storage unit 41. As illustrated in the drawings, the welding condition DB accumulates the target quality and the welding condition items to be corrected in order to achieve the target quality in a bi-directionally associated manner. Therefore, the setting assistance device 40 can derive the welding condition item to be corrected according to the selection of the target quality and output it to the teaching pendant 30 or can extract the influenced target quality according to the selection of the welding condition item and output it to the teaching pendant 30.

Further, the welding condition DB also accumulates the limit information indicating the limit of the value of the welding condition item in association with the target quality and the welding condition item. In the case where the target quality is a constant deposition quantity, the limit information is expressed as a constant deposition quantity curve for the sake of convenience, but in actuality, it is sufficient to store an expression of a constant deposition quantity curve. In the case where the target quality is normal bead formation, the limit information is expressed as the normal bead formation range for the sake of convenience, but in actuality, it is sufficient to store the equation of the straight line surrounding this range. Also, when the target quality is the required penetration depth and the welding condition item is the welding voltage, the limit information is expressed as a voltage penetration straight line for the sake of convenience, but in actuality, it is sufficient to store the equation of the voltage penetration straight line. In the case where the target quality is required bead irregularities and the welding condition item is welding voltage, the limit information is expressed as a voltage bead straight line for convenience, but in actuality, it is sufficient to store the equation of the voltage bead straight line.

Operation of Setting Assistance Device

Figure 4:
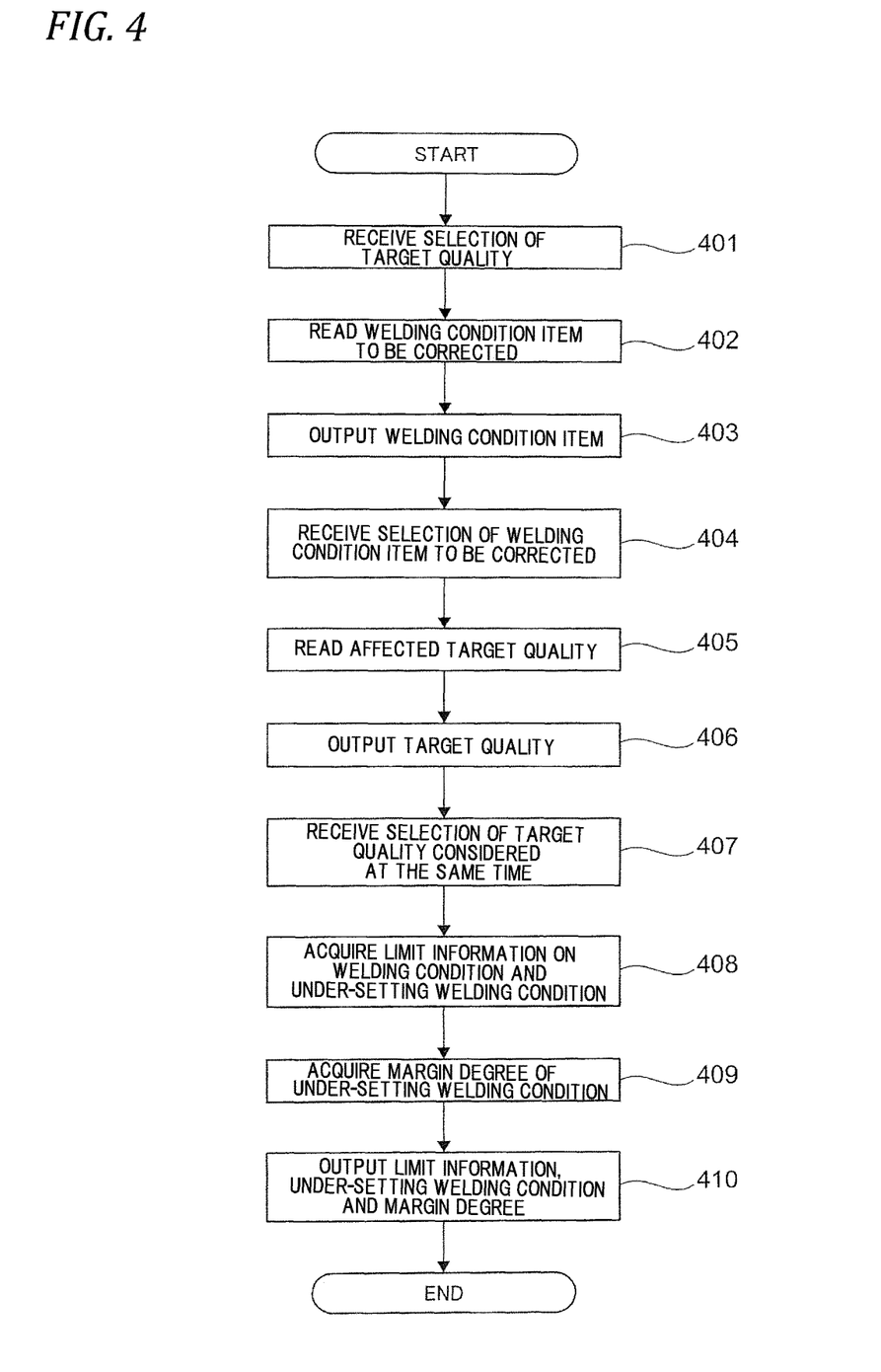
FIG. 4 is a flowchart illustrating an operation example of the setting assistance device according to the embodiment of the present invention.

FIG. 4 is a flow chart illustrating an operation example of the setting assistance device 40 in the present embodiment.

First, when the operator selects the target quality using the teaching pendant 30, the input receiving unit 42 of the setting assistance device 40 accepts the selection from the teaching pendant 30 (step 401). At this time, the operator may select a plurality of target qualities, and the input receiving unit 42 may accept selection of the plurality of target qualities. Then, the welding condition information acquiring unit 43 reads the welding condition item to be corrected in order to satisfy the target quality accepted in step 401 from the welding condition DB stored in the welding condition DB storage unit 41 (step 402). Further, the welding condition information output unit 44 outputs the welding condition item read out in step 402 to the teaching pendant 30 (step 403). As a result, the teaching pendant 30 displays the welding condition items to be corrected in order to satisfy the selected target quality.

Next, when the operator selects the welding condition items to be corrected from among the welding condition items displayed on the teaching pendant 30, in the setting assistance device 40, the input receiving unit 42 receives the selection from the teaching pendant 30 (step 404). Then, the welding condition information acquiring unit 43 reads the target quality that is affected by correcting the welding condition item accepted in step 404 from the welding condition DB stored in the welding condition DB storage unit 41 (step 405). Further, the welding condition information output unit 44 outputs the target quality read in step 405 to the teaching pendant 30 (step 406). As a result, the teaching pendant 30 displays the target quality that is affected by correcting the selected welding condition item.

Next, when the operator selects the target quality to be considered at the same time from the target quality displayed on the teaching pendant 30, in the setting assistance device 40, the input receiving unit 42 receives the selection from the teaching pendant 30 (step 407). Then, the welding condition information acquiring unit 43 acquires the limit information indicating the limit of the value of the welding condition item selected in step 404 and the under-setting welding condition which is the welding condition currently being set (step 408). Here, the limit information includes limit information according to the target quality and limit information due to the mechanical restriction of the welding robot 10. The welding condition information acquiring unit 43 may acquire the range or the like of the value of the welding condition items associated with the target quality selected in the step 401 and the step 407 and the welding condition item selected in the step 404, from the welding condition DB as limit information corresponding to the target quality. Further, as the limit information due to the mechanical restriction of the welding robot 10, from the storage region different from the welding condition DB, the range of values of the welding condition item due to the mechanical restriction of the welding robot 10 (hereinafter referred to as "mechanical range") or the like may be acquired. Further, the welding condition information acquiring unit 43 may also acquire the under-setting welding condition from a storage region different from the welding condition DB. Next, the welding condition information acquiring unit 43 acquires a margin degree indicating the margin of the under-setting welding condition (step 409). The welding condition information acquiring unit 43 may obtain the margin degree by calculation from the under-setting welding condition and the range acquired in step 408. Thereafter, the welding condition information output unit 44 outputs the limit information and under-setting welding condition acquired in step 408 and the margin degree obtained in step 409 to the teaching pendant 30 (step 410). As a result, the teaching pendant 30 displays the limit information, the under-setting welding condition, and the margin degree.

Hereinafter, an operation example of the setting assistance device 40 will be described, using specific examples of target quality and welding condition items.

FIRST OPERATION EXAMPLE

In the first operation example, the constant deposition quantity and the normal bead formation are used as a specific example of the target quality. Therefore, in this example, the description will be provided, while assuming that only rows having a constant deposition quantity and rows forming a normal bead exist among the rows of the welding condition DB illustrated in FIG. 3.

In the first operation example, it is assumed that the operator first selects to increase the efficiency with the constant deposition quantity as the target quality. As a selection method at this time, a method for displaying several target qualities on the liquid crystal screen of the teaching pendant 30 and selecting the constant deposition quantity from among them may be used. As a result, in step 401, the input receiving unit 42 accepts that constant deposition quantity is selected as the target quality. Then, in step 402, the welding condition information acquiring unit 43 reads the welding current and the welding speed as the welding condition items to be corrected. Then, in step 403, these are output to the teaching pendant 30.

Next, it is assumed that the operator selects the welding current and the welding speed as welding condition items to be corrected. As a selection method at this time, a method for selecting a welding condition item displayed on the liquid crystal screen of the teaching pendant 30 with a push button may be used, and a method for providing a function of collecting an manipulation log on the teaching pendant 30 to automatically select the welding condition item to be corrected frequently may be used. As a result, in step 404, the input receiving unit 42 accepts that welding current and welding speed are selected as welding condition items. Then, since the welding current and the welding speed are associated with normal bead formation in the welding condition DB, the welding condition information acquiring unit 43 reads the normal bead formation as the target quality affected by the welding condition item in step 405. Then, in step 406, it is output to the teaching pendant 30. Here, the normal bead formation means formation of a bead which does not cause undercuts, humping, and overlap. As a result of outputting the target quality of normal bead formation, it is understood that, in order to achieve the target quality of increasing the efficiency with a constant deposition quantity, it is necessary to correct the welding condition while conscious of normal bead formation. Further, by selecting the target quality of normal bead formation, it is possible to correct the welding condition in consideration of the normal bead formation in addition to the target quality that the original deposition quantity is constant.

Thus, it is assumed that the operator selects a normal bead formation as the target quality to be considered at the same time. As a result, the input receiving unit 42 accepts that the normal bead formation is selected as the target quality in step 407. Then, the welding condition information acquiring unit 43 reads the constant deposition quantity curve and the normal bead formation range from the welding condition DB at step 408. In addition, the mechanical range of the welding current and the welding speed, and the welding current and the welding speed currently being set are acquired. Thereafter, in step 410, the welding condition information output unit 44 outputs these pieces of information to the teaching pendant 30, and the teaching pendant 30 displays these pieces of information.

Figure 5:
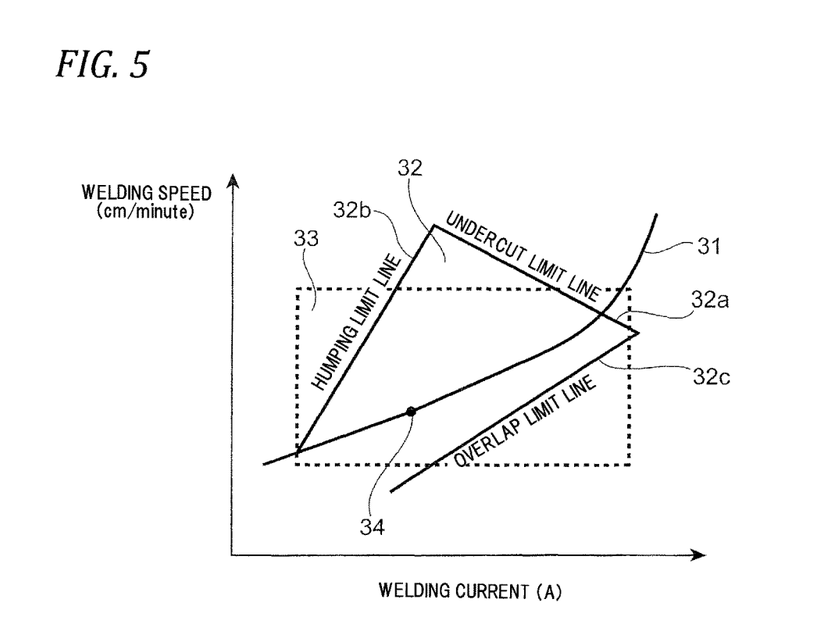
FIG. 5 is a diagram illustrating a display example when limit information and an under-setting welding condition are displayed on a teaching pendant in a first operation example.

FIG. 5 is a diagram illustrating a display example in the teaching pendant 30 at this time. As illustrated in the drawing, the teaching pendant 30 displays a graph 31 of a constant deposition quantity curve illustrating the relation between the welding current and the welding speed at which the deposition quantity becomes constant. In addition, the teaching pendant 30 displays a range 32 of the welding current and the welding speed at which the normal bead formation is enabled. More specifically, the range 32 is displayed by means of an undercut limit line 32a indicating the limit at which undercut does not occur, a humping limit line 32b indicating the limit at which no humping occurs, and an overlap limit line 32c indicating the limit at which no overlap occurs. In addition, the teaching pendant 30 displays the mechanical range 33 of the welding current and the welding speed. Furthermore, the teaching pendant 30 displays a point 34 indicating the welding current and the welding speed currently being set.

In addition, in step 409, the welding condition information acquiring unit 43 acquires the margin degree indicating the margin of the under-setting welding condition. Thereafter, the welding condition information output unit 44 outputs the margin degree to the teaching pendant 30 in step 410, and the teaching pendant 30 displays the margin degree. Here, the margin degree may be an index indicating how close the under-setting welding condition is to the boundary of the range acquired in step 408, or may be an index indicating that the under-setting welding condition is located within the adjustable range. Further, it may be expressed by a numerical value or may be a graph.

Figure 6:
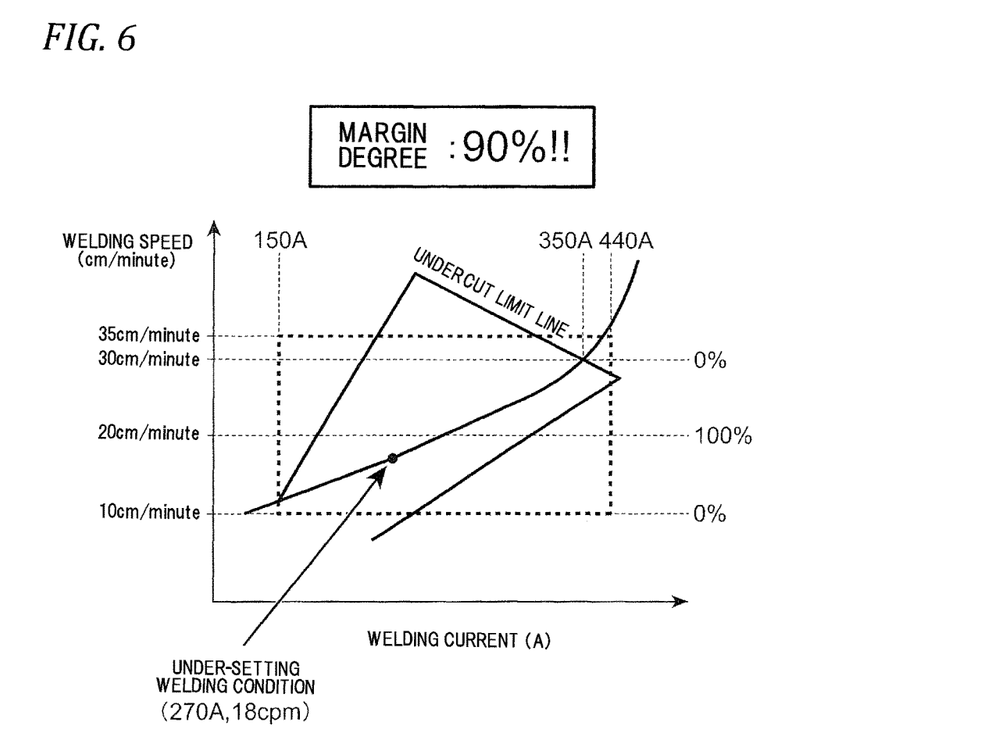
FIG. 6 is a diagram illustrating a display example when a margin degree is displayed on the teaching pendant in the first operation example.

FIG. 6 is a diagram illustrating a display example in the teaching pendant 30 at this time. Here, the mechanical range of the welding current is 150A to 440A, and the mechanical range of the welding speed is 10 cm/min to 35 cm/min. In addition, although the range for normal bead formation is indicated, it may be obtained by experiment or the like. Further, the welding condition currently being set is (270A, 18 cm/min). In this operation example, (I, S) means the points where the welding current is I and the welding speed is S. At this time, the intersection between the constant deposition quantity curve and the undercut limit line is (350A, 30 cm/min). Therefore, it is assumed that a welding speed of 20 cm/min of the intermediate between 10 cm/min and 30 cm/min is a welding speed of 100% margin degree for the undercut limit line. Then, since the margin degree of the under-setting welding condition is 100%−|18 cm/min−20 cm/min|/20 cm/min×100=90%, the teaching pendant 30 displays this numerical value as illustrated.

Accordingly, it is possible to know how much margin of the under-setting welding condition is set with respect to the undercut limit line. Therefore, while considering the risk of undercut caused by the increase in welding speed, it is possible to correct the welding speed while considering the specific correction amount and to set an appropriate correction amount for the target quality. Thus, the trial and error can be reduced.

Figure 7:
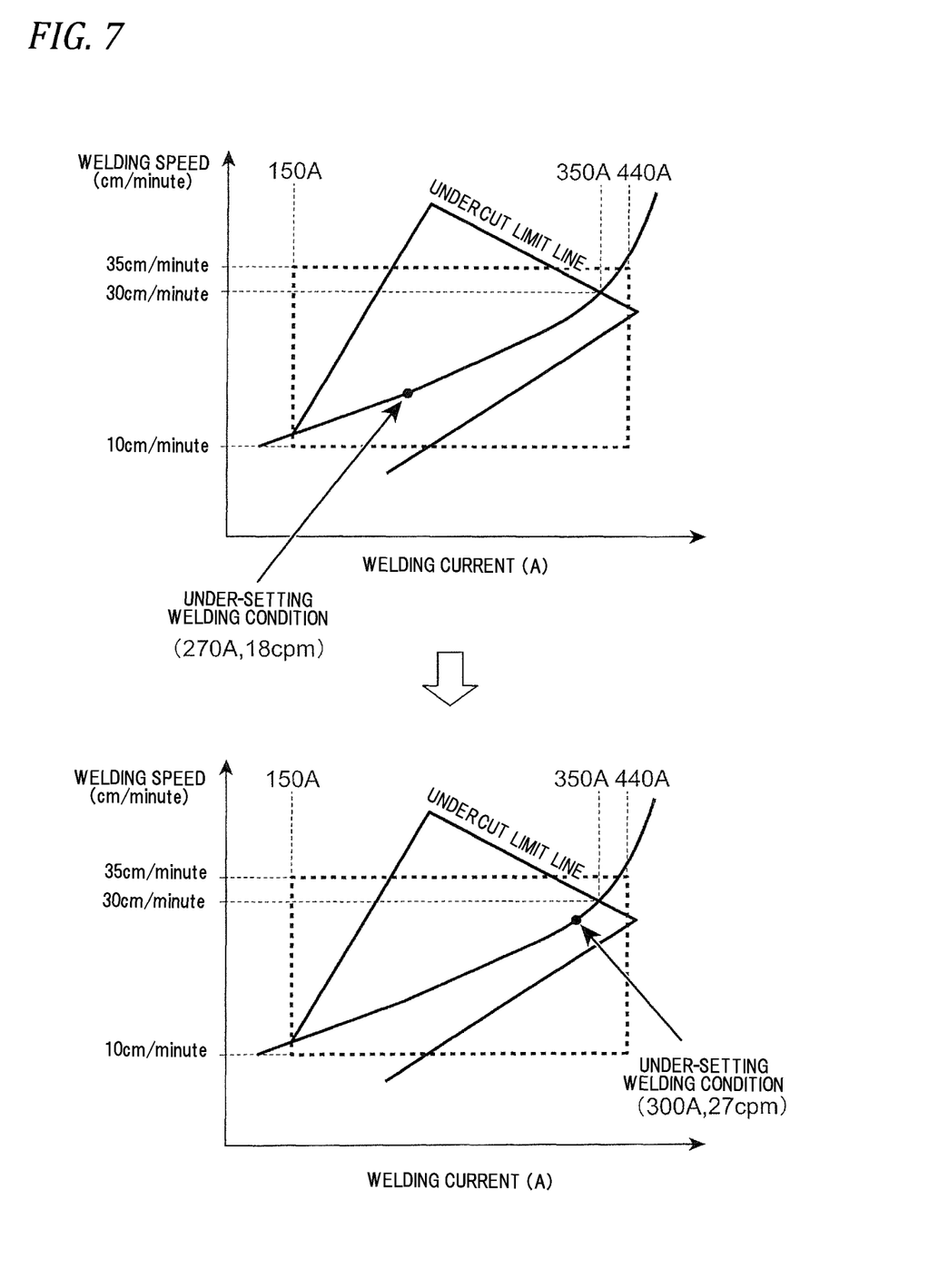
FIG. 7 is a diagram illustrating a manipulation example when welding conditions are corrected on the screen of the teaching pendant in the first operation example.

FIG. 7 is a diagram illustrating an example of a manipulation of correcting the welding condition on the screen displayed on the teaching pendant 30. The upper stage of the figure illustrates the screen when the under-setting welding condition is (270A, 18 cm/min). By specifying one point on the range or graph on the screen, it is possible to change the welding condition to (300A, 27 cm/min) as illustrated in the lower stage of the figure. For example, when a setting unit is provided in the setting assistance device 40 and a manipulation for instructing one point in the graph or range displayed on the teaching pendant 30 is performed, the setting unit may set the value corresponding to the point in the welding condition item. In this manipulation example, since a plurality of welding conditions (for example, the welding current and the welding speed) can be collectively changed by designating one point, the input time can also be shortened.

SECOND OPERATION EXAMPLE

In the second operation example, the required penetration depth and the required bead irregularity are used as a specific example of the target quality. Therefore, here, description will be given assuming that only the row of required penetration depth and the row of required bead irregularities exist among the rows of the welding condition DB illustrated in FIG. 3.

In the second operation example, it is assumed that the operator first selects the required penetration depth as the target quality. As a result, in step 401, the input receiving unit 42 accepts that the required penetration depth has been selected as the target quality. Then, in step 402, the welding condition information acquiring unit 43 reads the welding current, the welding voltage and the welding speed as the welding condition items to be corrected. Then, in step 403, these are output to the teaching pendant 30.

Next, it is assumed that the operator has selected a welding voltage as a welding condition item to be corrected. As a result, in step 404, the input receiving unit 42 accepts that welding voltage is selected as the welding condition item. Then, in step 405, the welding condition information acquiring unit 43 reads the irregularity of the required bead as the target quality affected by the correction of the welding voltage. In step 406, this is output to the teaching pendant 30.

Next, the operator selects the required bead irregularity as the target quality to be considered at the same time. As a result, in step 407, the input receiving unit 42 accepts that the required bead irregularity is selected as the target quality. Then, in step 408, the welding condition information acquiring unit 43 reads the voltage penetration straight line and the voltage bead straight line from the welding condition DB. In addition, the mechanical range of the welding voltage and the welding voltage currently being set are acquired. Thereafter, in step 410, the welding condition information output unit 44 outputs these pieces of information to the teaching pendant 30, and the teaching pendant 30 displays these pieces of information.

Figure 8:
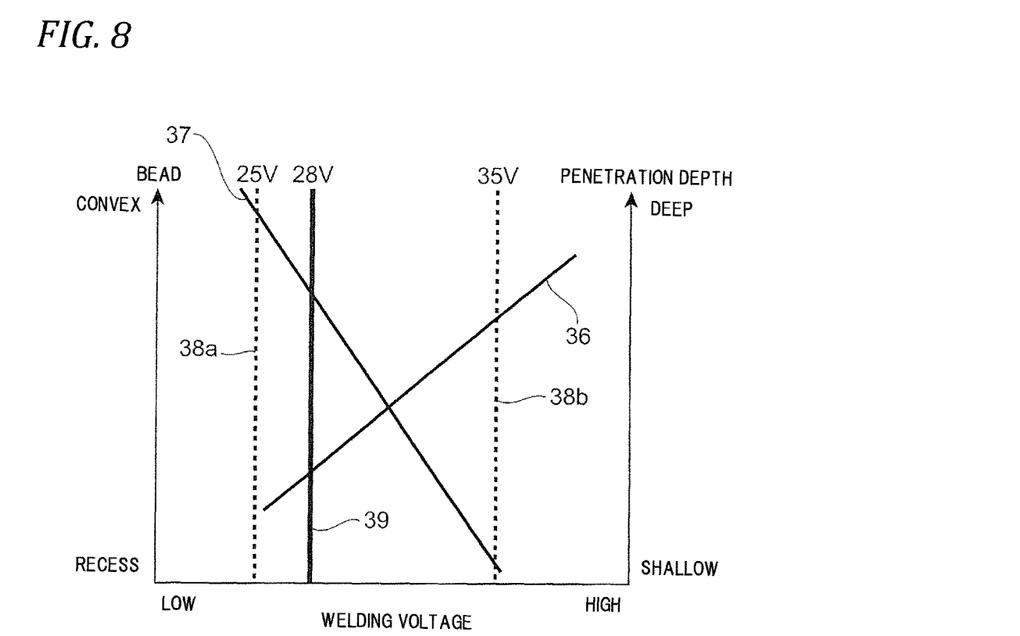
FIG. 8 is a diagram illustrating a display example when limit information and an under-setting welding condition are displayed on a teaching pendant in a second operation example.

FIG. 8 is a diagram illustrating a display example in the teaching pendant 30 at this time. As illustrated in the drawing, the teaching pendant 30 displays a graph 36 of a voltage penetration straight line illustrating the relation between the welding voltage and the required penetration depth. Further, the teaching pendant 30 displays a graph 37 of a voltage bead straight line illustrating the relation between the welding voltage and the required bead irregularity. Further, the teaching pendant 30 displays a lower limit line 38a and an upper limit line 38b illustrating the mechanical range of the welding voltage. Furthermore, the teaching pendant 30 displays a line 39 indicating the welding voltage currently being set.

In addition, in step 409, the welding condition information acquiring unit 43 acquires the margin indicating the margin degree of the under-setting welding condition. Thereafter, the welding condition information output unit 44 outputs the margin degree to the teaching pendant 30 in step 410, and the teaching pendant 30 displays the margin degree.

Figure 9:
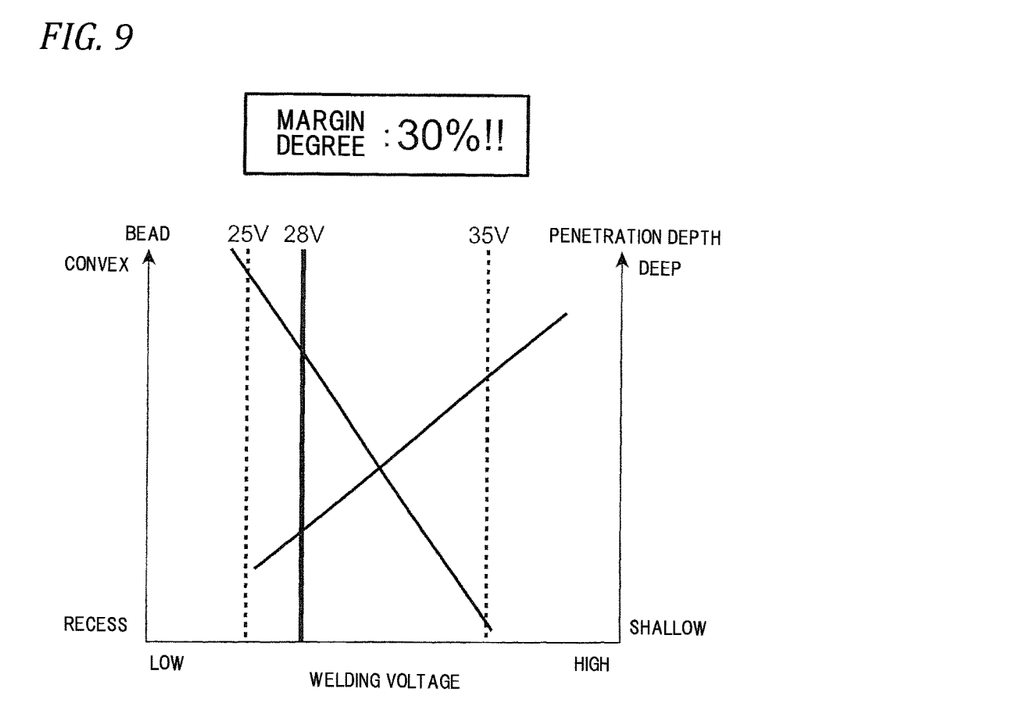
FIG. 9 is a diagram illustrating a first display example when a margin degree is displayed on the teaching pendant in the second operation example.

FIG. 9 is a diagram illustrating a first display example in the teaching pendant 30 at this time. Here, the mechanical range of the welding voltage is set to 25V to 35V. In addition, the welding voltage currently being set is 28V. At this time, 25V is set to 0%, and 35V is set to 100%. Then, since the margin degree of the welding voltage currently being set is 30%, the teaching pendant 30 displays this numerical value as illustrated in the drawing.

Figure 10:
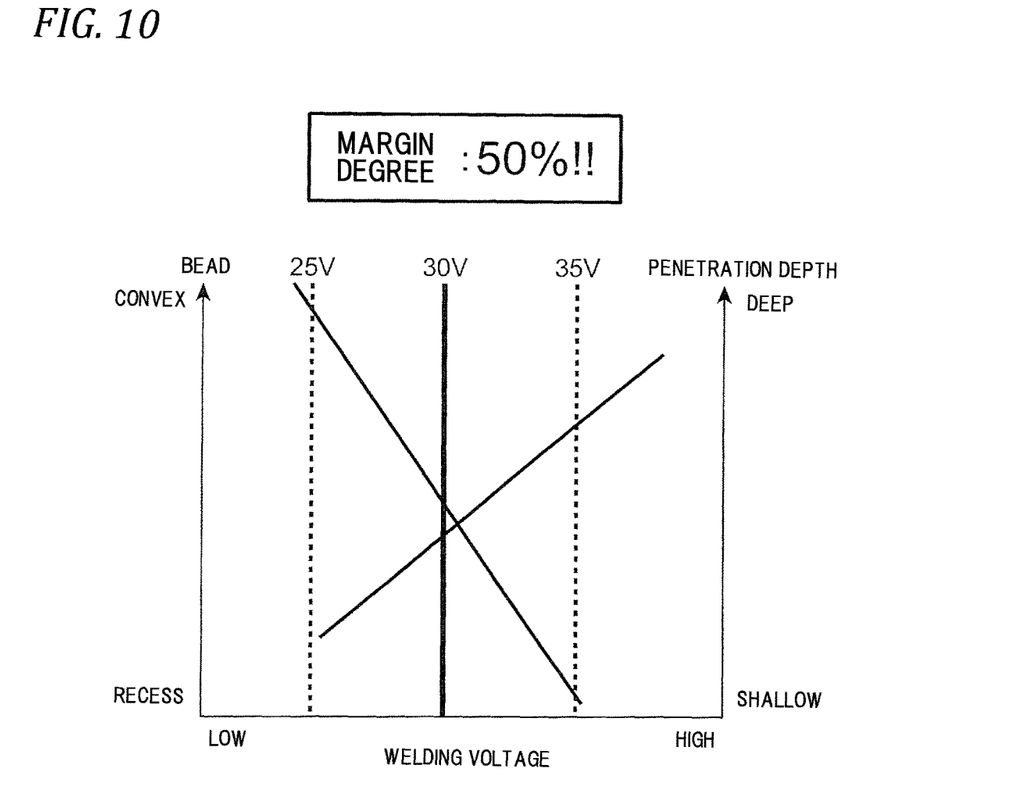
FIG. 10 is a diagram illustrating a second display example when a margin degree is displayed on the teaching pendant in the second operation example.

FIG. 10 is a diagram illustrating a second display example in the teaching pendant 30 at this time. Further, the mechanical range of the welding voltage is set to 25V to 35V as in FIG. 9. Meanwhile, the welding voltage currently being set is 30V unlike in FIG. 9. Then, since the margin degree of the welding voltage currently being set is 50%, the teaching pendant 30 displays this numerical value as illustrated in the drawing.

For example, when it is desired to make the bead shape concave, it is necessary to increase the voltage. At that time, by referring to the % indication, it is possible to know in what range the welding condition is located and to what extent the welding condition can be corrected within the range that the welding condition can take.

Further, in the display example illustrated in FIG. 9 or 10, it is also possible to change the welding voltage by specifying the range within the screen or the position of the graph.

Figure 11:
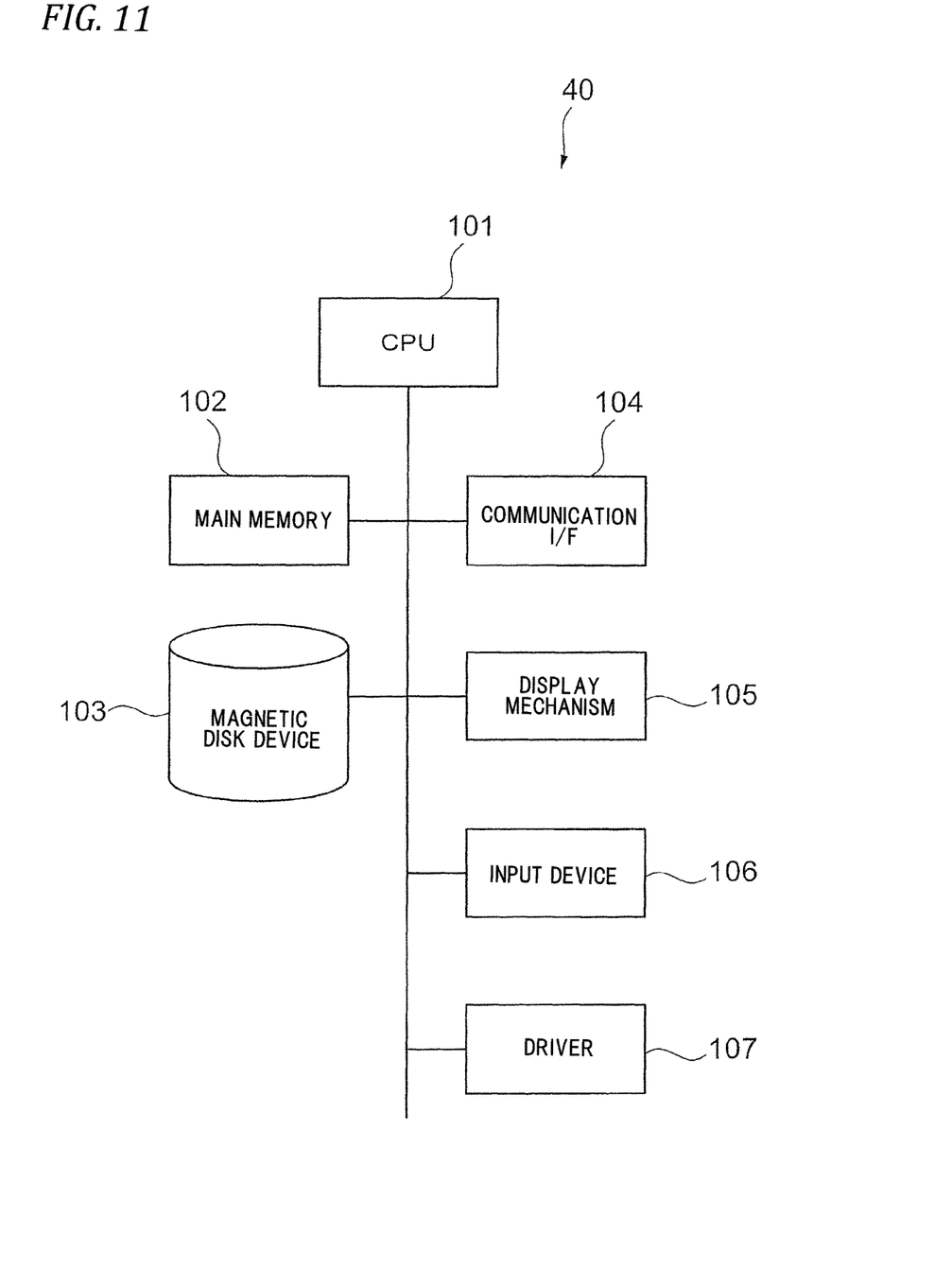
FIG. 11 is a diagram illustrating a hardware configuration example of a setting assistance device according to the present embodiment.

Next, the hardware configuration of the setting assistance device 40 will be described. FIG. 11 is a diagram illustrating a hardware configuration example of the setting assistance device 40.

As illustrated in the drawing, the setting assistance device 40 is achieved by, for example, a general-purpose PC (Personal Computer) or the like, and includes a CPU 101 as computing unit, a main memory 102 and a magnetic disk device (HDD: Hard Disk Drive) 103 as storage unit. Here, the CPU 101 executes various programs such as OS (Operating System) or application software, and realizes each function of the setting assistance device 40. The main memory 102 is a storage region for storing various programs and data used for its execution, and the HDD 103 is a storage region for storing input data for the various programs, output data from various programs, and the like.

Further, the setting assistance device 40 includes a communication OF 104 for performing communication with the outside, a display mechanism 105 including a video memory, a display, and the like, an input device 106 such as a keyboard and a mouse, and a driver 107 for reading and writing data from/to the storage medium. However, FIG. 11 is merely a configuration example of hardware, and the setting assistance device 40 is not limited to the configuration illustrated in the drawing.

The program realizing the embodiment of the present invention is, of course, provided by communication unit, and it can also be provided by being stored in a recording medium such as a CD-ROM.

As described above, in the present embodiment, when the target quality is selected, one or a plurality of welding conditions to be corrected are selectively displayed. As a result, since it is possible to know which welding condition should be corrected to satisfy the target quality, it is no longer necessary to search for welding conditions that need to be corrected in order to satisfy the target quality.

Further, in the present embodiment, a range or a graph illustrating the limit of the welding condition to be corrected, and a graph illustrating the relation between the target quality and the welding condition to be corrected are displayed. Thus, since it is possible to know the range in which the welding condition being set currently can be corrected, trial and error in correction work can be reduced.

Furthermore, in the present embodiment, when the welding conditions to be corrected are corrected, in addition to the welding conditions currently being set, the margin degree illustrating how much the margin of the welding condition currently being set exists for the range that can be taken by the welding condition to be corrected. As a result, the extent of the correction amount of the welding condition is known, and an appropriate correction amount is selected without selecting an excessive or too little correction amount when correcting the welding condition until the target quality is satisfied. Thus, a trial and error can be reduced in the correction work.

Furthermore, in the present embodiment, when selecting and correcting the welding condition to be corrected in order to satisfy a certain target quality, the relation with other target qualities associated with the welding condition is also simultaneously displayed in graphs and ranges. This makes it possible to make modifications for satisfying a certain target quality while taking into consideration the influence on other target qualities, thereby making it possible to reduce trial and error in the correction work.

This application is based on Japanese Patent Application (Japanese Patent Application No. 2015-039147) filed on Feb. 27, 2015, the contents of which are incorporated herein by reference.

DESCRIPTION OF REFERENCE NUMERALS AND SIGNS 1 welding robot system
10 welding robot
11 welding torch
20 robot control panel
30 teaching pendant (display unit)
40 setting assistance device
41 welding condition DB storage unit
42 input receiving unit
43 welding condition information acquiring unit
44 welding condition information output unit

The invention claimed is:

1. A setting assistance device, for a welder, of a welding condition which is a condition in welding, the setting assistance device comprising:
   a processor which receives designation of a target quality in the welding;
   a welding condition database which stores information including:
      welding condition item information identifying a plurality of welding condition items to be corrected to achieve the target quality; and
      limit information indicating a limit for each welding condition item to be corrected according to the target quality; and
   a display which displays the welding condition item information and the limit information, depending on acceptance of designation of the target quality by the processor,
   wherein the processor acquires the welding condition item information and the limit information from the welding condition database,
   the display displays a margin degree of values currently set in the welding condition items for a range of an allowable item value in accordance with the acceptance of the designation of the target quality by the processor, and
   the display displays a graph or a range including a plurality of points respectively corresponding to a plurality of values of the welding condition items as the limit information.

2. The setting assistance device according to claim 1, wherein the display further displays the values of the welding condition items in accordance with the acceptance of the designation of the target quality by the processor.

3. The setting assistance device according to claim 2, wherein the display further displays another target quality that is affected by correcting the values of the welding condition items, and another limit information indicating a limit of the allowable item value to achieve said another target quality, in accordance with the acceptance of the designation of said another target quality by the processor.

4. The setting assistance device according to claim 1, wherein the processor:

sets the welding condition, and sets a value corresponding to a specific point included in the graph or the range displayed by the display.

5. The setting assistance device according to claim 1, wherein the display displays information illustrating the relationship between the welding condition item information and the limit information on a single graph.

6. The setting assistance device according to claim 5, wherein the graph includes an axis associated with a first welding condition item of the welding condition items and an axis associated with a second welding condition item of the welding condition items.

\* \* \* \* \*